United States Patent
Liu et al.

(10) Patent No.: US 10,137,959 B2
(45) Date of Patent: Nov. 27, 2018

(54) ELECTRIC BICYCLE DRIVE ASSEMBLY WITH TORQUE DETECTION

(71) Applicants: Chun-Hsiang Liu, Taipei (TW); Chung-Li Chin, New Taipei (TW)

(72) Inventors: Chun-Hsiang Liu, Taipei (TW); Chung-Li Chin, New Taipei (TW)

( * ) Notice: Subject to any disclaimer, the term of this patent is extended or adjusted under 35 U.S.C. 154(b) by 97 days.

(21) Appl. No.: 15/334,300

(22) Filed: Oct. 26, 2016

(65) Prior Publication Data

US 2018/0111660 A1 Apr. 26, 2018

(51) Int. Cl.
*B62M 6/50* (2010.01)
*B62M 6/55* (2010.01)
*B62M 23/02* (2010.01)

(52) U.S. Cl.
CPC .............. *B62M 6/50* (2013.01); *B62M 6/55* (2013.01); *B62M 23/02* (2013.01); *B62M 2701/0092* (2013.01)

(58) Field of Classification Search
CPC .................................. B62M 6/50; B62M 6/55
See application file for complete search history.

(56) References Cited

U.S. PATENT DOCUMENTS

| 8,646,560 | B2 * | 2/2014 | Chan | B62M 6/50 |
| | | | | 180/206.3 |
| 8,677,837 | B2 * | 3/2014 | Mercat | G01L 3/1457 |
| | | | | 73/862.325 |
| 9,616,969 | B2 * | 4/2017 | MacMartin | B62M 6/55 |
| 2014/0150569 | A1 * | 6/2014 | Huang | B62M 6/50 |
| | | | | 73/862.333 |

FOREIGN PATENT DOCUMENTS

GB 2522019 A * 7/2015 ............. B62M 6/50

* cited by examiner

*Primary Examiner* — Kevin Hurley
(74) *Attorney, Agent, or Firm* — Muncy, Geissler, Olds & Lowe, P.C.

(57) ABSTRACT

Disclosed is an electric bicycle drive assembly with torque detection, including a torque detection mechanism, a clutch mechanism, a sleeve member, a pedal axle, and an electric machine assembly. The electric machine assembly is coupled to a seat, and the seat is mounted a vehicle frame. The torque detection mechanism, the clutch mechanism, and the sleeve member are assembled in sequence with the pedal axle extending therethrough and are arranged inside the seat. In case that the pedal axle is operable to drive the torque detection mechanism to rotate, when the torque detection mechanism detects a torque, a signal is generated and fed to a controller module to activate the electric machine assembly, such that the electric machine assembly drives the sleeve member and the clutch mechanism to rotate and the clutch mechanism in turn drives a toothed wheel of a bicycle to rotate.

9 Claims, 8 Drawing Sheets

ELECTRIC BICYCLE DRIVE ASSEMBLY WITH TORQUE DETECTION

(a) TECHNICAL FIELD OF THE INVENTION

The present invention relates generally to an electric bicycle drive assembly with torque detection, and more particularly to an arrangement that a torque detection mechanism is coupled to a pedal axle of a bicycle to allow the torque detection mechanism to detect a rotating torque generated by the pedal axle for serving as basis for controlling and driving, whereby when the torque detection mechanism detects a rotating torque generated by the pedal axle, the torque detection mechanism generates and applies a signal to a controller module for activating and controlling an electric machine assembly and the electric machine assembly drives, via rotation of a sleeve member and a clutch mechanism, a toothed wheel of the bicycle to rotate so that the bicycle may receive assistance of electrical power through activation of the electric machine assembly according to a magnitude of a torque generated by rider's pedaling and thus perfect matching riding requirements of the bicycle for various conditions can be achieved.

(b) DESCRIPTION OF THE PRIOR ART

Conventional electric bicycles are generally structured by mounting an electric motor on a bicycle frame such that power generated by the electric motor is transmitted through a transmission mechanism to drive bicycle wheels to rotate. In other words, a simple transmission arrangement is adopted where the electric motor is used to drive the bicycle in order to save physical strength of a rider required for riding the bicycle.

However, the conventional electric bicycles control activation of the electric motor in a passive way. In other words, a controller that controls the activation of the electric motor is provided and mounted on a handlebar of the bicycle such that the electric motor of the conventional electric bicycle can only be controlled and activated through an operation of the controller by a rider. This makes it not possible for the electric motor to activate timely if the rider is not aware of the operation of the controller. On the other hand, the rider who has to pay attention to the road condition when riding the electric bicycle, may get distracted in operating the controller. This may cause undesired risks of a rider of an electric bicycle resulting from distraction.

Taiwan Patent Publication No. I1426035 discloses a clutch based electric drive device for electric bicycles and a clutch-based driver thereof. Taiwan Patent Publication TW201350383 discloses a vehicle transmission system, in which transmission components are arranged and assembled in sequence and this makes it not possible to simplify the structure and reduce the size thereof and also leads to an excessive spanning distance between left and right pedals of the bicycle, making it not possible to provide a good and practical spanning distance. In addition, this also increases the number of the components of the transmission assembly, and consequently, parts costs and assembly time are increased.

SUMMARY OF THE INVENTION

The present invention provides an electric bicycle drive assembly with torque detection, which is applicable for combination with a vehicle frame of a bicycle and comprises a torque detection mechanism, a clutch mechanism, a sleeve member, a pedal axle, and an electric machine assembly. The electric machine assembly is coupled to a seat, and is thus coupled, via the seat, to the vehicle frame. Further, the electric machine assembly is provided, in the interior thereof, with a controller module. The torque detection mechanism comprises a sensing section and is provided with a torque detection element. The torque detection element is electrically connected to the sensing section and the controller module, and the torque detection element detects a variation of the sensing section to generate a signal and applies the signal to the controller module to allow the controller module to activate and control the electric machine assembly. Further, the torque detection mechanism, the clutch mechanism, and the sleeve member are assembled in sequence with the pedal axle extending therethrough and are arranged in an interior space of the seat. The pedal axle drives the torque detection mechanism to rotate and the torque detection mechanism drives the clutch mechanism to rotate, and then, the clutch mechanism drives a toothed wheel of the bicycle to rotate. Alternatively, the electric machine assembly drives the sleeve member to rotate and the sleeve member drives the clutch mechanism and the toothed wheel of the bicycle to rotate.

Technical features of the present invention are that in a situation that the pedal axle drives the torque detection mechanism to rotate, when the torque detection mechanism detects a rotating torque, the torque detection mechanism generates and applies a signal to the controller module to activate and control the electric machine assembly, such that the electric machine assembly may drive the sleeve member and the clutch mechanism to rotate and the clutch mechanism in turn drives the toothed wheel of the bicycle to rotate thereby achieving activation of the electric machine assembly based on a magnitude of a torque generated by pedaling power supplied by a rider of the bicycle, whereby after the activation, the power supplied from the electric machine assembly provides assistance, which when used in combination with human power, achieves synchronous driving with dual powers and helps save physical strength of the user.

This helps eliminates the problems that the motor of the electric machine assembly cannot be properly activated due to a user being not aware how to operate a controller and distraction of a user riding an electric bicycle results from the user needing to watch road condition and at the same time paying attention to the operation of the controller.

Further, the present invention is structured by having the torque detection mechanism, the clutch mechanism, and the sleeve member fit to and combined with each other so that a combined arrangement of a driving assembly can be achieved to thereby provide a simplified structure with a reduced size and effectively reduces spanning distance between left and right pedals to provide better and practical spanning distance. Further the number of parts necessary for the drive assembly is reduced and thus, the parts costs and assembly time can be reduced.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
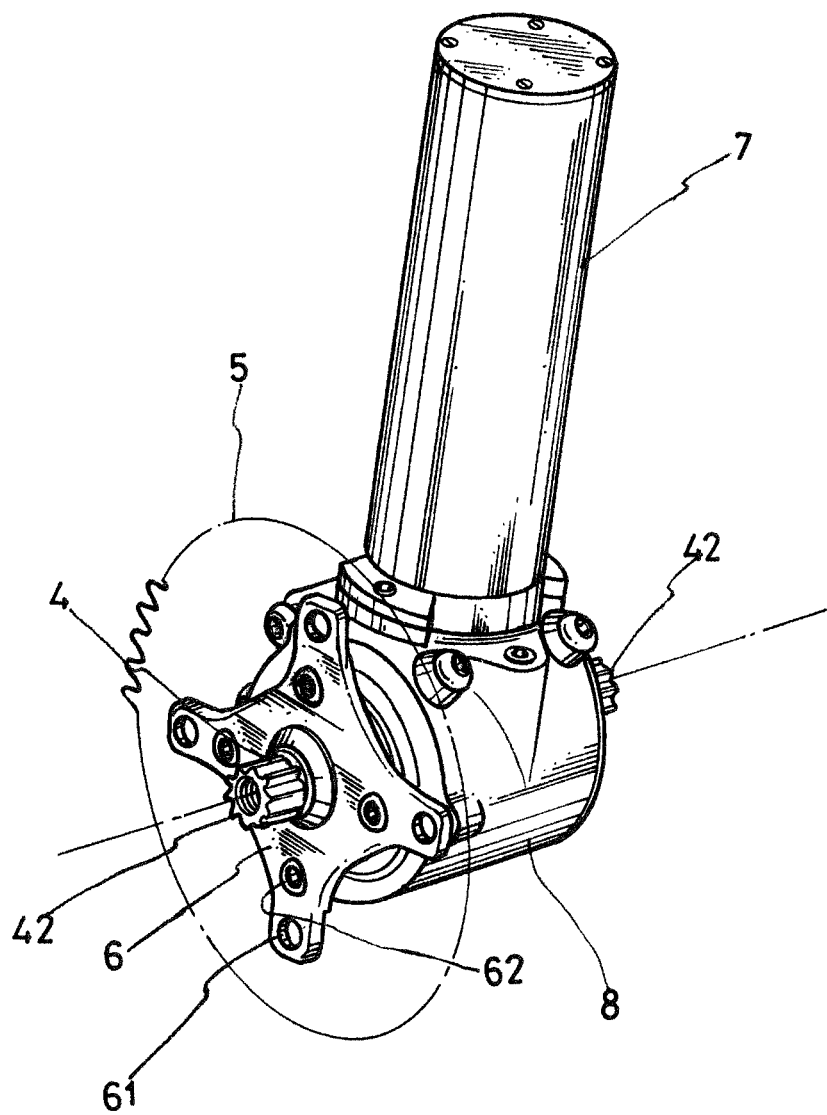
FIG. 1 is a perspective view showing, in an assembled form, an electric bicycle drive assembly with torque detection according to the present invention.
Figure 2:
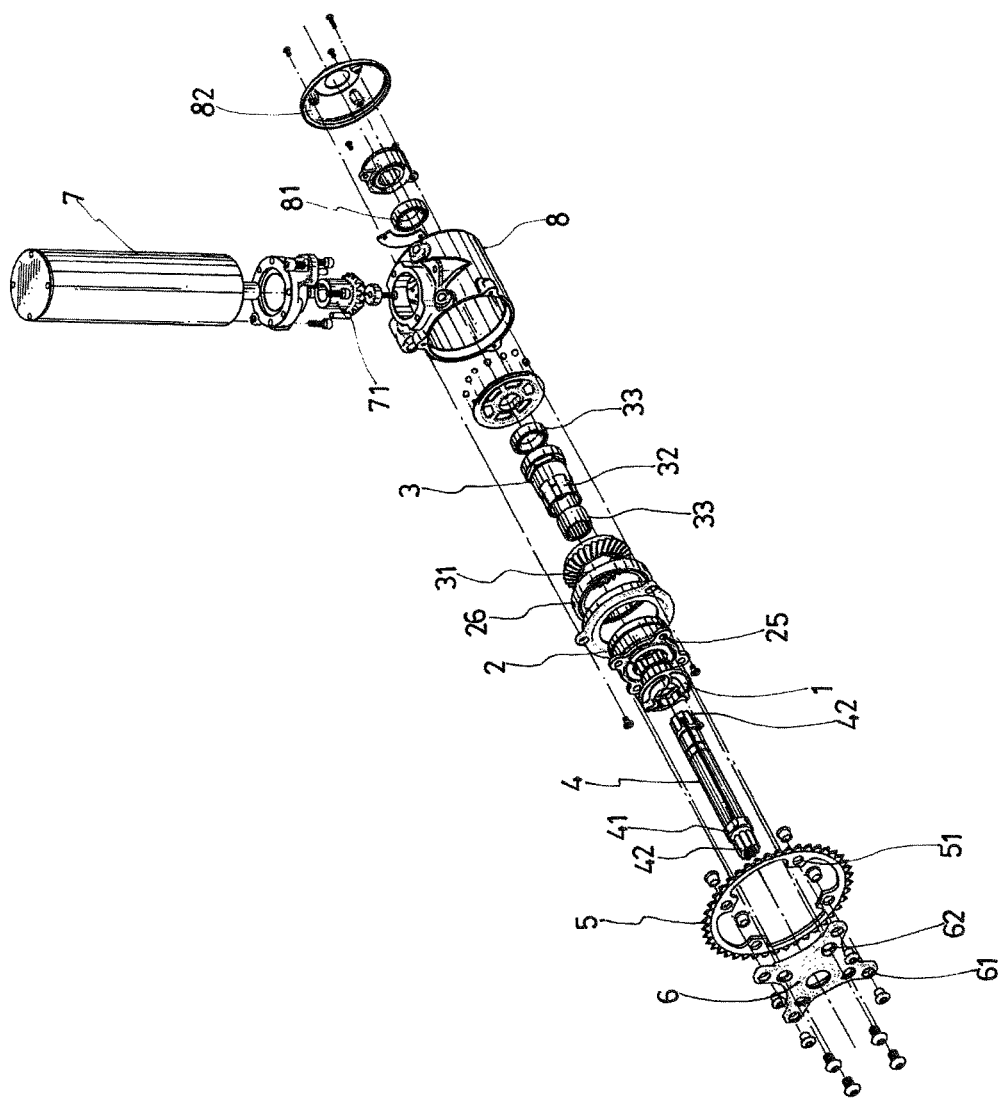
FIG. 2 is an exploded view showing the electric bicycle drive assembly with torque detection according to the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-8, the present invention provides an electric bicycle drive assembly with torque detection, which is combinable with a vehicle frame of a bicycle. The electric bicycle drive assembly comprises: a torque detection mechanism 1, a clutch mechanism 2, a sleeve member 3, a pedal axle 4, and an electric machine assembly 7.

The torque detection mechanism 1 comprises a base 11. The base 11 has one side that is provided with a sensing section 12 and an opposite side that is provided with a first coupling section 13. The base 11 is provided with a torque detection element 14, and the torque detection element 14 is electrically connected to the sensing section 12. The torque detection element 14 detects torque variation of the sensing section 12 and generates a signal. The detection of torque variation of the sensing section 12 can be achieved with strain gauges 121 attached to an inner shaft 122 and an outer circumference 123 of the sensing section 12 at locations where shear forces are applied in order to obtain variation of torque.

Figure 3:
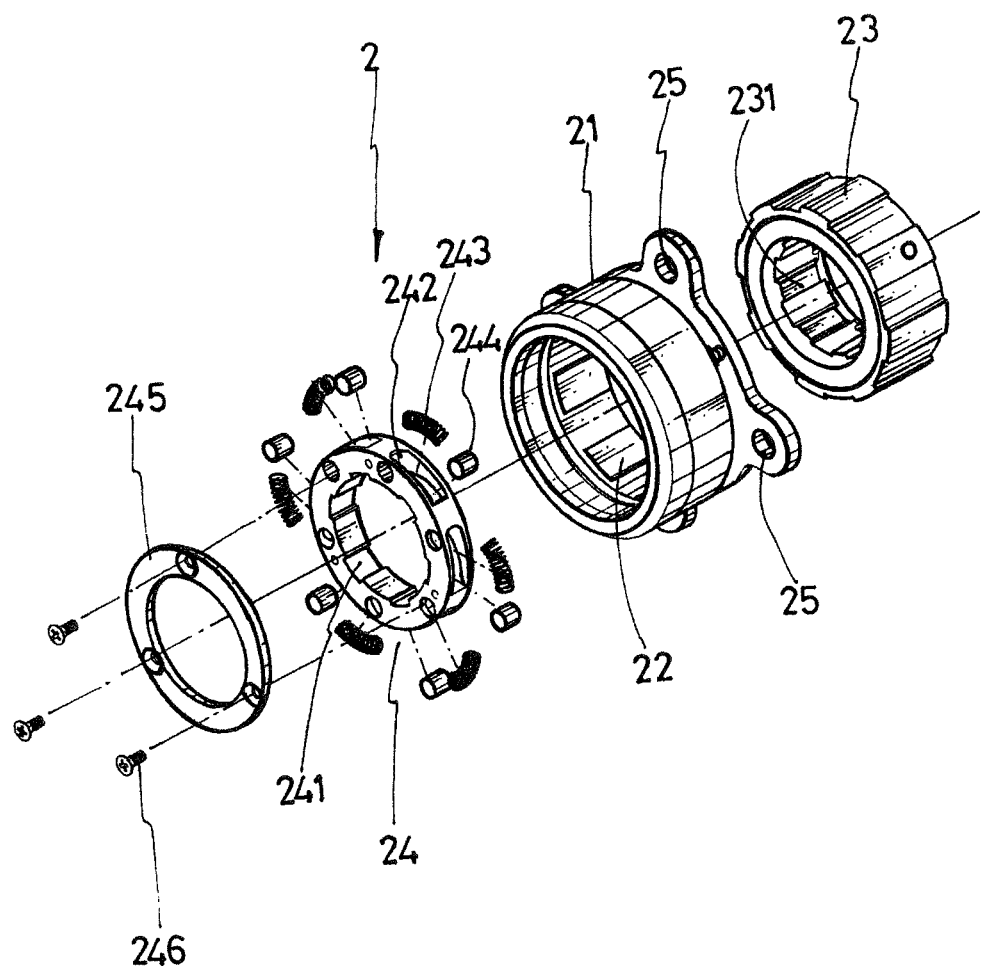
FIG. 3 is an exploded view illustrating a clutch mechanism of the electric bicycle drive assembly with torque detection according to the present invention.
Figure 4:
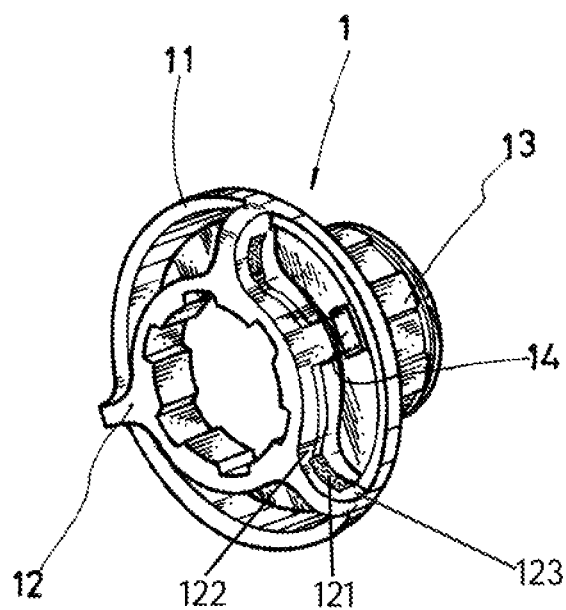
FIG. 4 is a perspective view illustrating a toque detection mechanism of the electric bicycle drive assembly with torque detection according to the present invention.
Figure 5:
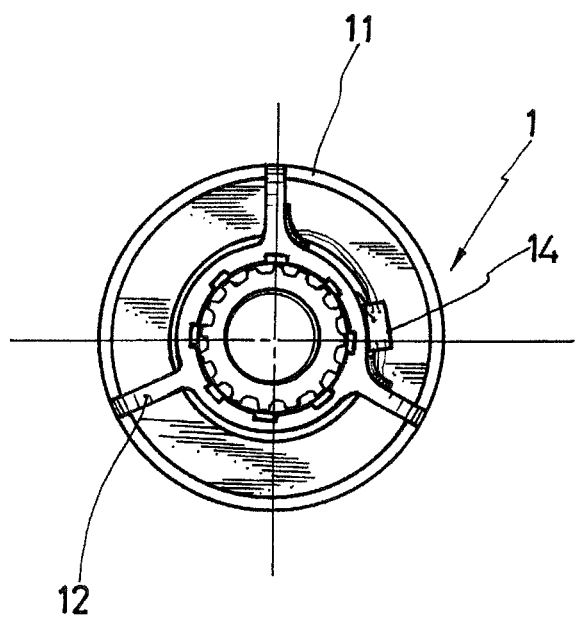
FIG. 5 is a front view illustrating the torque detection mechanism of the electric bicycle drive assembly with torque detection according to the present invention.
Figure 6:
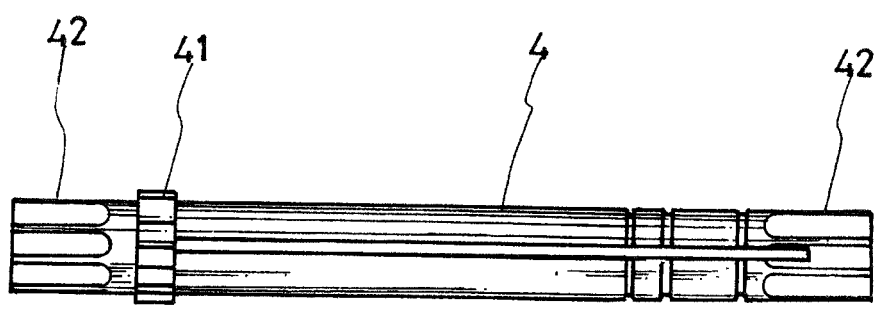
FIG. 6 is a schematic view illustrating an axle of the electric bicycle drive assembly with torque detection according to the present invention.
Figure 7:
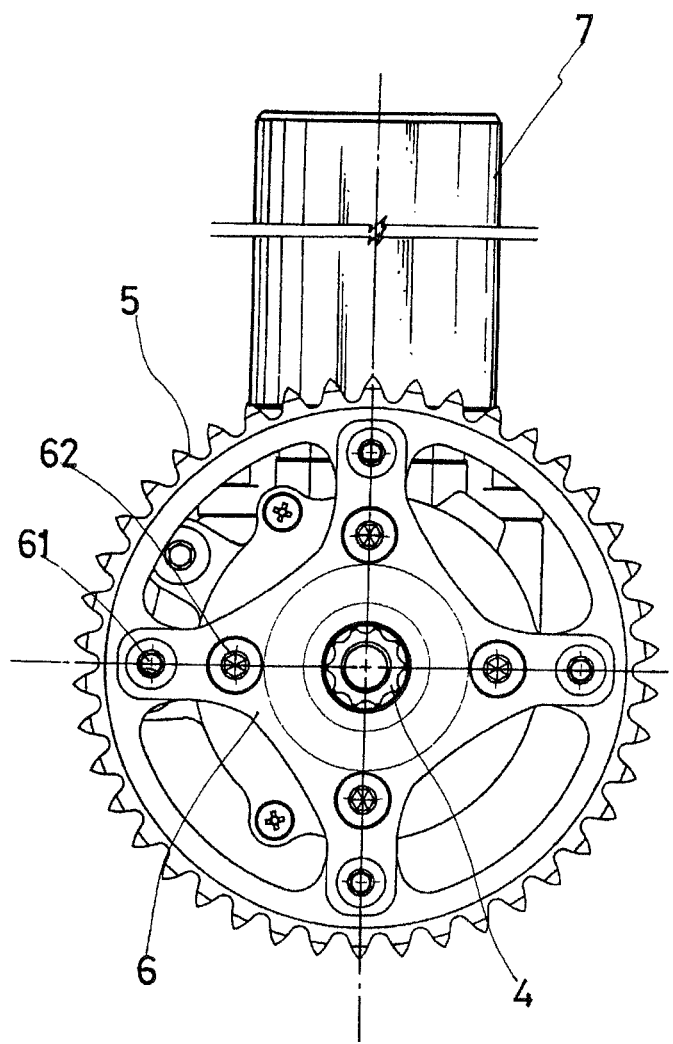
FIG. 7 is a front view showing, in an assembled form, the electric bicycle drive assembly with torque detection according to the present invention.
Figure 8:
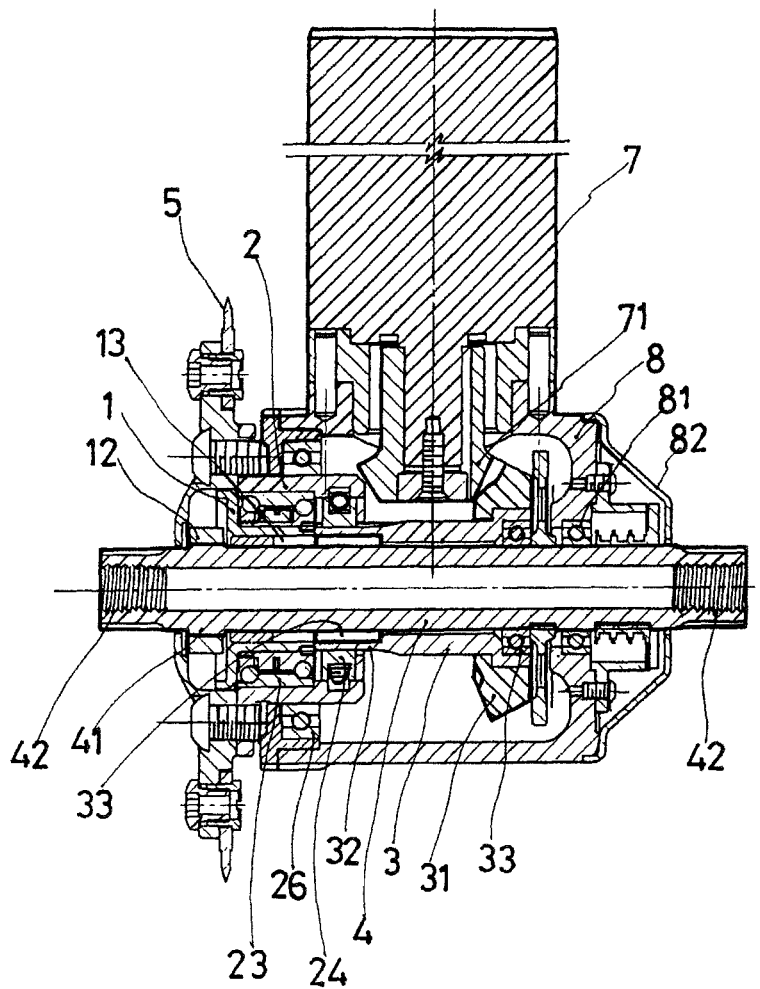
FIG. 8 is a cross-sectional view showing, in an assembled form, the electric bicycle drive assembly with torque detection according to the present invention.

The clutch mechanism 2 is combined with the torque detection mechanism 1. The clutch mechanism 2 comprises a casing 21, a first bearing 23, and a one-way ring 24 (as shown in FIG. 3). The casing 21 is mounted to the vehicle frame of the bicycle. The casing 21 has an inside wall on which a second coupling section 22 is formed. The first bearing 23 is coupled to the second coupling section 22 inside the casing 21. The first bearing 23 has an inside wall on which a third coupling section 231 is formed and the third coupling section 231 is coupled to the first coupling section 13 so as to have the torque detection mechanism 1 combined and rotated with the clutch mechanism 2. The one-way ring 24 is coupled inside the casing 21 and is arranged at one side of the second coupling section 22. The one-way ring 24 has an inside wall on which a fourth coupling section 241 is formed. The casing 21 is provided with a plurality of first mounting sections 25 projecting outward therefrom. The casing 21 is coupled, on an outside thereof, with a second bearing 26. The one-way ring 24 has an outside circumferential wall in which a plurality of recessed troughs 242 is formed at intervals. Each of the recessed troughs 242 is provided therein with a spring 243 and a block 244. The one-way ring 24 is also provided with a cover lid 245. The cover lid 245 is fastened by means of a plurality of fasteners 246 to a side surface of the one-way ring 24 that faces outwardly of the casing 21. The cover lid 245 allows the one-way ring 24 to be retained inside the casing 21 in such a way that the springs 243 of the one-way ring 24 bias the blocks 244, respectively, in a predetermined direction to provide the one-way ring 24 with a uni-directional rotation mechanism in the interior of the casing 21.

The sleeve member 3 is combined with the clutch mechanism 2. The sleeve member 3 is coupled, on an outside thereof, with a first bevel gear 31 and is provided with a fifth coupling section 32, such that the fifth coupling section 32 is coupled to the fourth coupling section 241 of the one-way ring 24. The sleeve member 3 is provided, in each of two opposite end openings thereof, with a third bearing 33.

The pedal axle 4 is set to extend through the torque detection mechanism 1, the clutch mechanism 2, and the sleeve member 3. The pedal axle 4 is provided, on an outside thereof, with a sixth coupling section 41, such that the sixth coupling section 41 is coupled to an inside of the sensing section 12 of the torque detection mechanism 1. The pedal axle 4 has two opposite ends each provided with a joint section 42 such that the joint section 42 is connected with a pedal crank. With the pedal axle 4 set to extend through the sleeve member 3, the pedal axle 4 is sequentially coupled with the third bearings 33 of the sleeve member 3 such that the sleeve member 3 is allowed to rotate with the pedal axle 4 as a center.

The electric machine assembly 7 is provided therein with a controller module. The torque detection element 14 of the torque detection mechanism 1 is electrically connected to the controller module. The electric machine assembly 7 has an end coupled to a seat 8 and is connected with a second bevel gear 71, such that the second bevel gear 71 is received and positioned in an interior space of the seat 8. The clutch mechanism 2, the sleeve member 3, and the pedal axle 4 are individually received and arranged in the interior space of the seat 8 such that the first bevel gear 31 of the sleeve member 3 mates the second bevel gear 71 to allow the electric machine assembly 7 to drive the sleeve member 3 to rotate. The joint sections 42 at the two ends of the pedal axle 4 individually extend outside the seat 8. The seat 8 is provided with at least one fourth bearing 81, so that when the pedal axle 4 is set through the seat 8, the pedal axle 4 is coupled to the fourth bearing 81. A side of the seat 8 that is distant from the torque detection mechanism 1 is combined with a cover 82.

The vehicle frame of the bicycle is provided with a toothed wheel 5, and the toothed wheel 5 is provided, on an inner circumference thereof, with a plurality of second mounting sections 51, such that coupling to a first coupler 6 can be achieved with the plurality of second mounting sections 51. The first coupler 6 is provided with a plurality of third mounting sections 61 and a plurality of fourth mounting sections 62, where the plurality of third mounting sections 61 are respectively coupled to the plurality of second mounting sections 51 and the plurality of fourth mounting sections 62 are respectively coupled to the plurality of first mounting sections 25 to allow the clutch mechanism 2 to drive the toothed wheel 5 to rotate.

When human power is supplied to drive the pedal axle 4 to rotate, the sixth coupling section 41 of the pedal axle 4 drives the torque detection mechanism 1 to rotate; the first coupling section 13 of the torque detection mechanism 1 drives the clutch mechanism 2 to rotate; and the plurality of first mounting sections 25 of the clutch mechanism 2 drive the toothed wheel 5 to rotate.

When the electric machine assembly 7 is activated and in operation, the second bevel gear 71 of the electric machine assembly 7 drives the first bevel gear 31 and the sleeve member 3 to rotate and the fifth coupling section 32 of the sleeve member 3 drives the one-way ring 24 to rotate and drives the clutch mechanism 2 to rotate, wherein the pedal axle 4 is held stationary and thus, the plurality of first mounting sections 25 of the clutch mechanism 2 drives the toothed wheel 5 to rotate.

As such, in a situation that human power is supplied to drive the pedal axle 4 to cause the torque detection mechanism 1 to rotate, when the torque detection element 14 of the torque detection mechanism 1 detects the sensing section 12 is acted upon by a rotational torque, the torque detection element 1 generates and applies a signal to the controller module of the electric machine assembly 7 so that the controller module activates and controls the electric machine assembly 7 in such a way that the electric machine assembly 7 rotates the second bevel gear 71 for driving the first bevel gear 31, and the first bevel gear 31 drives the sleeve member 3 to have the sleeve member 3 drives the clutch mechanism 2 and thus drives the toothed wheel 5 to rotate thereby achieving activation of the electric machine assembly 7 based on a magnitude of a torque generated by pedaling a bicycle. As such, the power supplied from the electric machine assembly 7 serves as an assistance as a part of combined power (combination of human power and electrical power), which when used in combination with human power, provides an effect of simultaneous driving by dual powers and may help save consumption of physical strength of a rider.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:
1. An electric bicycle drive assembly with torque detection, which is applicable for combination with a vehicle frame of a bicycle, wherein the bicycle comprises a toothed wheel, the electric bicycle drive assembly comprising:
a torque detection mechanism, which comprises a sensing section and a torque detection element, the torque detection element being electrically connected to the sensing section to allow the torque detection element to detect torque variation of the sensing section and generate a signal;
a clutch mechanism, which is combined with the toothed wheel and the torque detection mechanism, the clutch mechanism comprising a first bearing and a one-way ring, the first bearing being arranged inside the clutch mechanism and coupled to the torque detection mechanism such that the torque detection mechanism is coupled through the first bearing to the clutch mechanism and thus rotatable, the one-way ring being arranged inside the clutch mechanism and located at one side of the first bearing, the clutch mechanism being coupled to the toothed wheel such that the clutch mechanism and the toothed wheel are synchronously rotatable; and
a sleeve member, which is coupled to the one-way ring of the clutch mechanism, the sleeve member being coupled to a drive device such that the sleeve member is driven by an electric machine assembly to rotate;
wherein when the torque detection mechanism is rotated with human power, the torque detection mechanism drives the clutch mechanism to rotate and the clutch mechanism drives the toothed wheel to rotate; and when the torque detection element detects torque variation induced in the sensing section, the torque detection element generates and applies a signal to a controller module to allow the controller module to activate and control the electric machine assembly, such that the electric machine assembly drives the sleeve member and the clutch mechanism to rotate and thus driving the toothed wheel to rotate.

2. The electric bicycle drive assembly with torque detection according to claim 1, wherein the torque detection mechanism comprises a base, the base having a side on which a sensing section is provided and an opposite side on which a first coupling section is provided, the base being provided with a torque detection element; and the clutch mechanism further comprises a casing, the casing having an inside wall on which a second coupling section is provided, the first bearing being coupled to the second coupling section inside the casing, the first bearing having an inside wall on which a third coupling section is provided, the third coupling section being coupled to the first coupling section, the one-way ring being provided, on an inside wall thereof, with a fourth coupling section, the casing comprising a plurality of first mounting sections extending outward therefrom such that the first mounting sections are coupled to the toothed wheel; and the sleeve member is provided, on an outside thereof, with a fifth coupling section, the fifth coupling section being coupled to the fourth coupling section of the one-way ring.

3. The electric bicycle drive assembly with torque detection according to claim 2 comprising a pedal axle, which extends through the torque detection mechanism, the clutch mechanism, and the sleeve member, the pedal axle being provided, on an outside thereof, with a sixth coupling section, the sixth coupling section being coupled to an inside of the sensing section of the torque detection mechanism, wherein when the pedal axle is rotated, the sixth coupling section of the pedal axle drives the torque detection mechanism to rotate and the torque detection mechanism drives the clutch mechanism to rotate, and then the clutch mechanism drives the toothed wheel to rotate.

4. The electric bicycle drive assembly with torque detection according to claim 3 comprising an electric machine assembly, which is provided therein with a controller module, the torque detection element being electrically connected to the controller module, the electric machine assembly having an end coupled to a seat and connected with a second bevel gear, such that the second bevel gear is received and positioned in an interior space of the seat, the clutch mechanism, the sleeve member, and the pedal axle being individually received and arranged in the interior space of the seat, the sleeve member being coupled, on an outside thereof, with a first bevel gear, the first bevel gear mating the second bevel gear, the pedal axle having two ends respectively extending outside the seat, wherein when the drive device rotates, the electric machine assembly rotates the second bevel gear and drives the first bevel gear, so that the first bevel gear drives the sleeve member and the sleeve member drives the clutch mechanism and thus drives the toothed wheel to rotate.

5. The electric bicycle drive assembly with torque detection according to claim 3, wherein the sleeve member has two end openings in each of which a third bearing is arranged, the pedal axle extending through the sleeve member and coupled to the third bearings such that the sleeve member is rotatable about a center defined by the pedal axle.

6. The electric bicycle drive assembly with torque detection according to claim 2, wherein the one-way ring has an outer circumferential wall in which a plurality of recessed troughs are formed at intervals and each of the recessed troughs receives therein a spring and a block, the springs of the one-way ring biasing the blocks respectively in a predetermined direction to provide the one-way ring with a uni-directional rotation mechanism inside the casing.

7. The electric bicycle drive assembly with torque detection according to claim 6, wherein the one-way ring is further provided with a cover lid, and the cover lid is mounted to a side of the one-way ring that faces outwardly of the casing.

8. The electric bicycle drive assembly with torque detection according to claim 2, wherein the toothed wheel is provided on an inner circumference with a plurality of second mounting sections, the second mounting sections being coupled to a first coupler, the first coupler being provided with a plurality of third mounting sections and a plurality of fourth mounting sections, the third mounting sections being coupled to the second mounting sections, the fourth mounting sections being coupled to the first mounting sections so that the clutch mechanism drives the toothed wheel to rotate.

9. The electric bicycle drive assembly with torque detection according to claim 1, wherein the detection of torque variation of the sensing section is achieved with a strain gauge attached to an inner shaft and an outer circumference of the sensing section at locations where a shear force is applied in order to obtain the torque variation.

\* \* \* \* \*